United States Patent
Huang et al.

(10) Patent No.: US 7,311,432 B2
(45) Date of Patent: Dec. 25, 2007

(54) BACKLIGHT MODULES AND FLUORESCENT LAMP ASSEMBLIES THEREOF

(75) Inventors: Chao-Kai Huang, Taipei (TW);
Meng-Chieh Cheng, Shengang Township, Taichung County (TW);
Pei-Chen Chan, Puli Township, Nantou County (TW)

(73) Assignee: AU Optronics Corp., Hsinchu (TW)

( * ) Notice: Subject to any disclaimer, the term of this patent is extended or adjusted under 35 U.S.C. 154(b) by 288 days.

(21) Appl. No.: 11/141,873

(22) Filed: Jun. 1, 2005

(65) Prior Publication Data
US 2006/0203506 A1 Sep. 14, 2006

(30) Foreign Application Priority Data
Mar. 8, 2005 (TW) .............................. 94106956 A

(51) Int. Cl.
*F21V 7/04* (2006.01)
(52) U.S. Cl. .................. 362/614; 362/613; 349/70; 349/71; 313/485; 313/634; 313/635; 313/636
(58) Field of Classification Search ............... 362/613, 362/614; 349/70, 71; 313/467, 525, 543, 313/485–487, 634–636
See application file for complete search history.

(56) References Cited
U.S. PATENT DOCUMENTS
5,227,693 A * 7/1993 Sakakibara et al. ......... 313/489

| 2002/0024803 | A1* | 2/2002 | Adachi et al. ................. 362/31 |
| 2003/0123258 | A1 | 7/2003 | Nitto et al. |
| 2004/0130881 | A1* | 7/2004 | Han et al. ...................... 362/31 |
| 2004/0145319 | A1* | 7/2004 | Fujiwara et al. ............. 313/634 |
| 2004/0252481 | A1* | 12/2004 | Moon ........................... 362/31 |

FOREIGN PATENT DOCUMENTS
| CN | 1595262 | 3/2005 |
| EP | 0449307 A2 | 10/1991 |
| JP | 07272507 | 10/1995 |

OTHER PUBLICATIONS
China Office Action mailed Feb. 1, 2007.

* cited by examiner

*Primary Examiner*—Stephen F Husar
*Assistant Examiner*—Meghan K. Dunwiddie
(74) *Attorney, Agent, or Firm*—Thomas, Kayden, Horstemeyer & Risley

(57) ABSTRACT

Backlight modules. A backlight module for a flat display device includes a light guide element and a fluorescent lamp assembly. The fluorescent lamp assembly disposed on a first side of the light guide element includes a first fluorescent lamp and a second fluorescent lamp. The first fluorescent lamp comprises a first end, a second end and a first phosphor coating on an inner surface of the first fluorescent lamp, wherein the first phosphor near the first end is thicker than the second end. The second fluorescent lamp comprises a third end adjacent to the second end, a fourth end adjacent to the first end, and a second phosphor coating on an inner surface of the second fluorescent lamp, wherein the second phosphor near the third end is thicker than the fourth end.

14 Claims, 3 Drawing Sheets

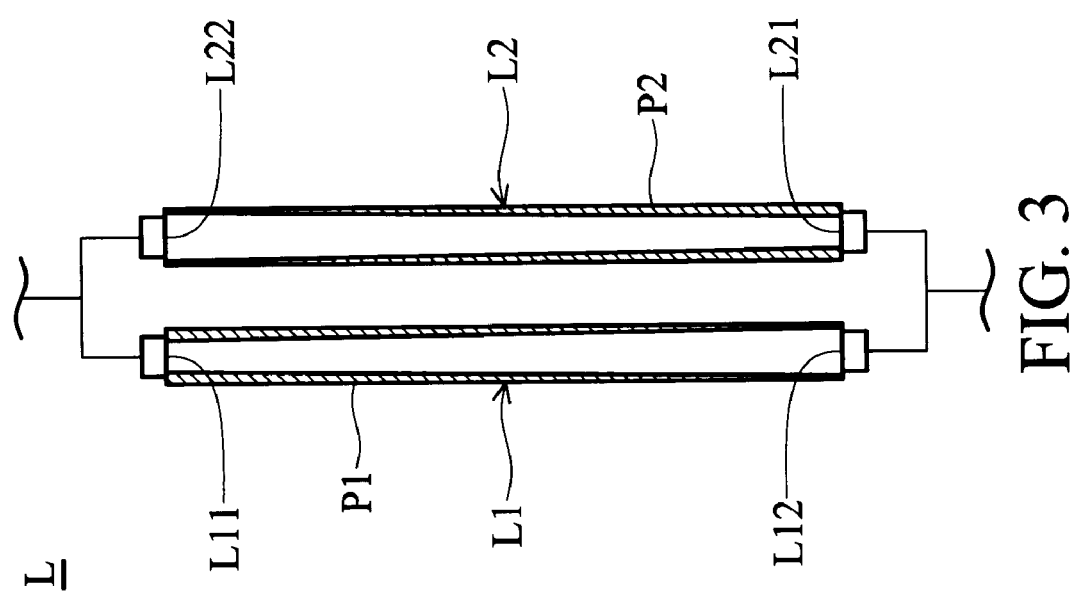

BACKLIGHT MODULES AND FLUORESCENT LAMP ASSEMBLIES THEREOF

BACKGROUND

The invention relates in general to backlight modules and in particular to backlight modules and fluorescent lamp assemblies thereof improving illumination uniformity of flat display devices.

Referring to FIG. 1, a conventional fluorescent lamp 10 comprises red, blue and green phosphors P coated on the inner surface thereof. The phosphor P is impacted by free electrons between an exhaust end E and a sealed end S of the fluorescent lamp 10 to provide illumination.

To coat phosphor P on the inner surface of the fluorescent lamp 10, first, air in the lamp tube is exhausted through the exhaust end E, and phosphor P is inhaled into the lamp tube from the sealed end S. Subsequently, air is reversely inhaled into the lamp tube from the exhaust end E to dry the phosphor P. Thus, the phosphor P is firmly adhered to the inner surface of the fluorescent lamp 10.

During fabrication, however, some phosphor P may peel off the inner surface of the fluorescent lamp 10 due to the reverse air flow, such that the phosphor P on the inner surface of the fluorescent lamp 10 is non-uniform. As shown in FIG. 1, as the phosphor P near the sealed end S is usually thicker than the exhaust end E, thus illumination of the fluorescent lamp 10 is also non-uniform.

FIG. 2 illustrates a conventional backlight module employing two fluorescent lamps 10. The fluorescent lamp 10 can be a Cold Cathode Fluorescent Lamp (CCFL) or an External Electrode Fluorescent Lamp (EEFL). As shown in FIG. 2, the conventional backlight module comprises a light guide element G with two oppositely disposed fluorescent lamps 10 on a first side G1 and a second side G2 respectively. Both fluorescent lamps 10 emit light into the light guide element G to form a planar light source.

In FIG. 2, region A is adjacent to the exhaust end E of the fluorescent lamp 10, and region B is adjacent to the sealed end S of the fluorescent lamp 10. Luminance and brightness in regions A and B can be different due to nonuniform distribution of phosphor P in the fluorescent lamp 10. Thus, the light guide element G cannot provide uniform luminance and brightness.

SUMMARY

Backlight modules are provided. An exemplary embodiment of a backlight module for a flat display device includes a light guide element and a fluorescent lamp assembly. The fluorescent lamp assembly disposed on a first side of the light guide element includes a first fluorescent lamp and a second fluorescent lamp parallel to the first fluorescent lamp. The first fluorescent lamp comprises a first end, a second end and a first phosphor coating on an inner surface of the first fluorescent lamp, wherein the first phosphor near the first end is thicker than the second end. The second fluorescent lamp comprises a third end adjacent to the second end, a fourth end adjacent to the first end, and a second phosphor coating on an inner surface of the second fluorescent lamp, wherein the second phosphor near the third end is thicker than the fourth end.

DESCRIPTION OF THE DRAWINGS

FIG. 3 is a perspective diagram of an embodiment of a fluorescent lamp assembly.

DETAILED DESCRIPTION

Referring to FIG. 3, an exemplary embodiment of a fluorescent lamp assembly L includes a first fluorescent lamp L1 and a second fluorescent lamp L2. The first fluorescent lamp L1 comprises a first end L11, a second end L12 and a first phosphor P1 coating on the inner surface of the first fluorescent lamp L1. The second fluorescent lamp L2 comprises a third end L21, a fourth end L22 and a second phosphor P2 coating on the inner surface of the second fluorescent lamp L2.

The first and second fluorescent lamps L1 and L2 can be Cold Cathode Fluorescent Lamps or an External Electrode Fluorescent Lamps. Specifically, the first end L11 is a sealed end of the first fluorescent lamp L1, and the second end L12 is an exhaust end of the first fluorescent lamp L1. The third end L21 is a sealed end of the second fluorescent lamp L2, and the fourth end L22 is an exhaust end of the second fluorescent lamp L2. The first phosphor P1 near the first end is L11 is thicker than the second end L12, and the second phosphor P2 near the third end L21 is thicker than the fourth end L22.

In FIG. 3, the first and second fluorescent lamps L1 and L2 are parallel and form a parallel electrical circuit. To drive the fluorescent lamp assembly L, the first end L11 and the second end L12 are electrically connected to a power supply, and the third end L21 and fourth end L22 are electrically connected to ground. In some embodiments, the first end L11 and the second end L12 are electrically connected to ground, and the third end L21 and fourth end L22 are electrically connected to a power supply to activate the first and second fluorescent lamps L1 and L2.

With respect to the first and second fluorescent lamps L1 and L2 as shown in FIG. 3, the first end L11 is situated adjacent to the fourth end L22, and correspondingly, the second end L12 is situated adjacent to the third end L21. Since the first end L11 and third end L21 are corresponding to sealed ends having relatively thicker phosphor, and the second end L12 and the fourth end L22 are corresponding to exhaust ends having relatively thinner phosphor, luminance and brightness at the ends of the first and second fluorescent lamps L1 and L2 are complementary, thus facilitating illumination uniformity of the fluorescent lamp assembly L.

Figure 2:
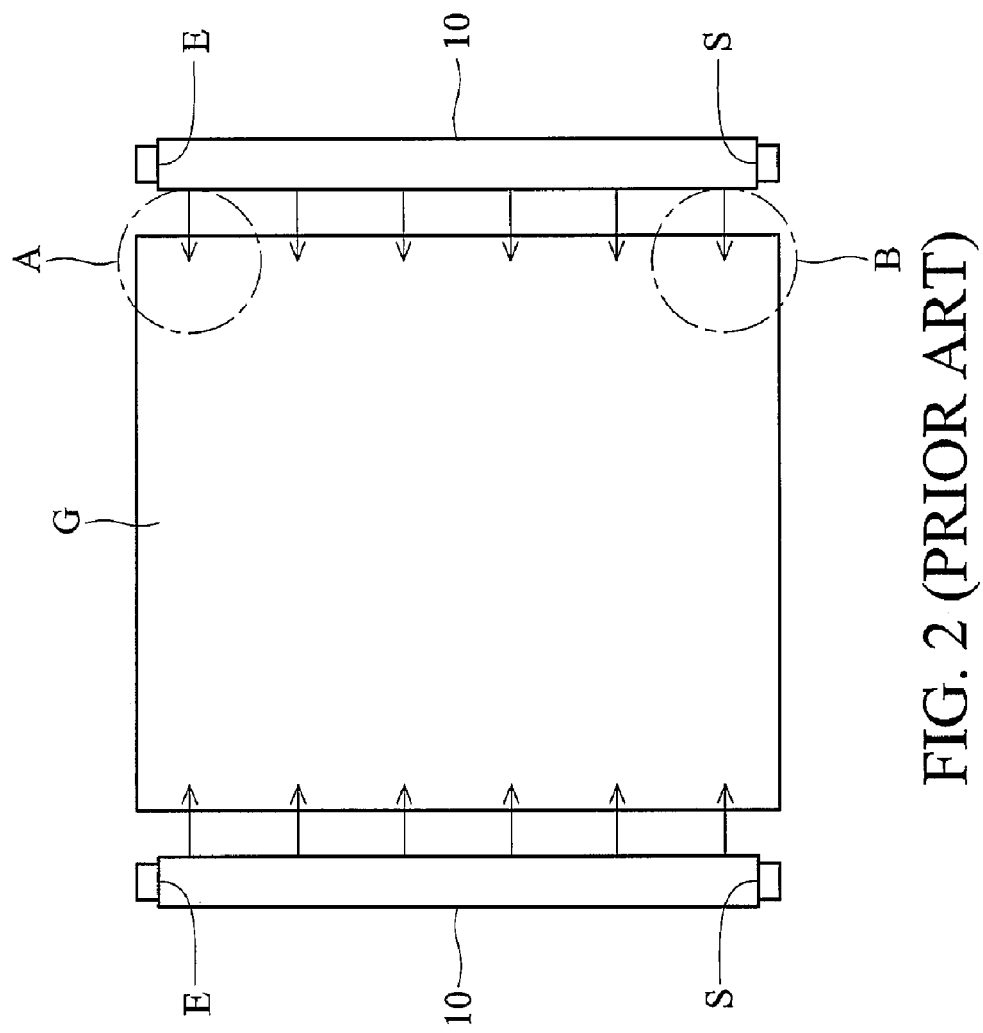
FIG. 2 is perspective diagram of a conventional backlight module.
Figure 1:
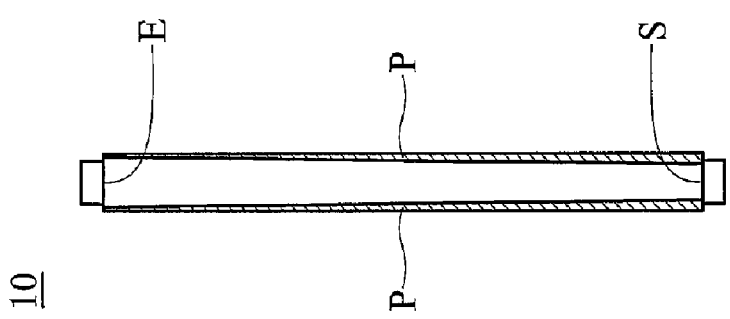
FIG. 1 is a perspective diagram of a conventional fluorescent lamp.
Figure 4:
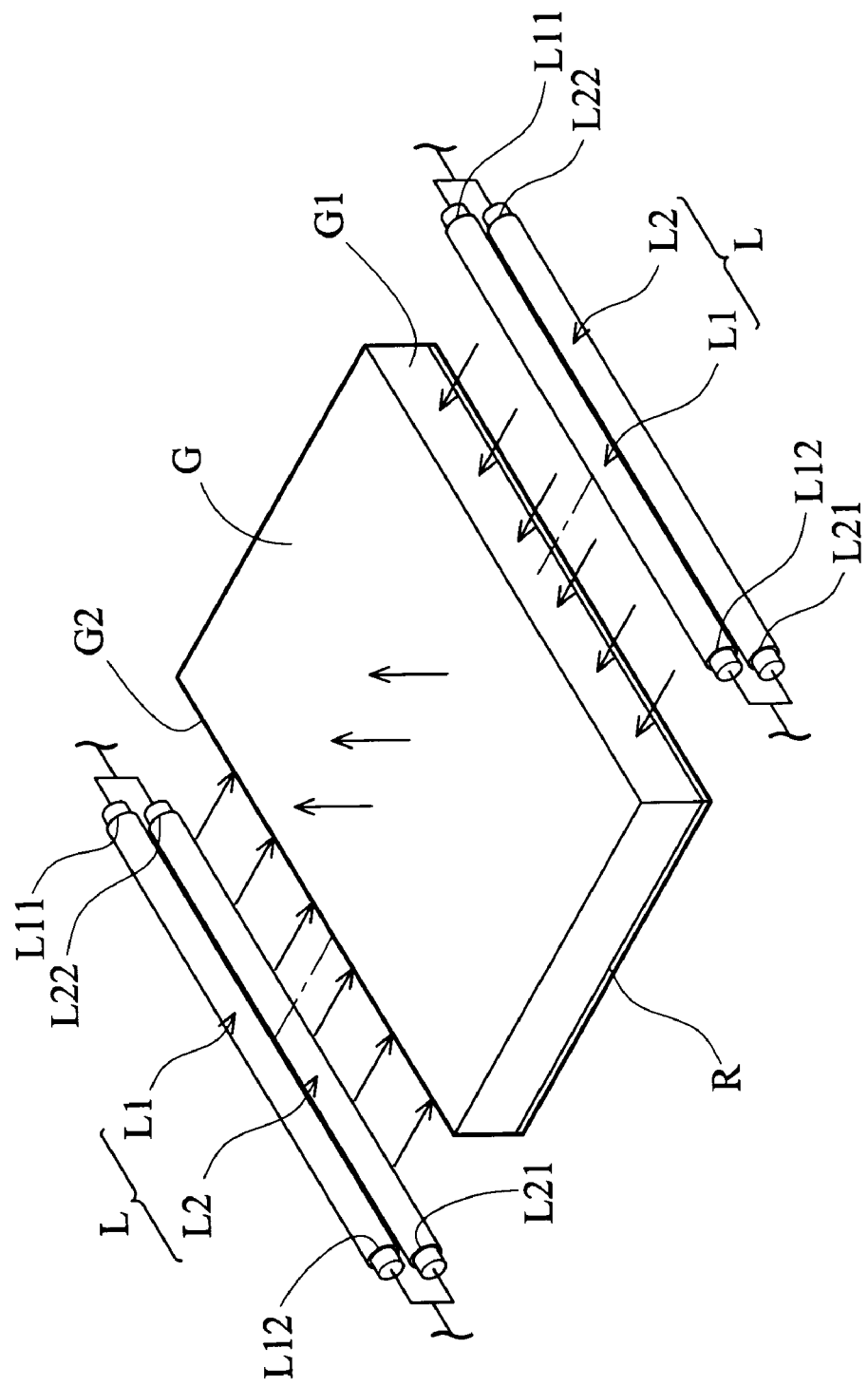
FIG. 4 is a perspective diagram of an embodiment of a backlight module.

Referring to FIG. 4, an exemplary embodiment of a backlight module comprises a rectangular light guide element G, a reflector R and two fluorescent lamp assemblies L. The fluorescent lamp assemblies L are respectively disposed on a first side G1 and a second side G2 opposite to each other. The reflector R is disposed below the light guide element G. Light from the fluorescent lamp assemblies L enters the light guide element G and reflects via the reflector R, thus forming a planar light source.

In FIG. 4, the first and second fluorescent lamps L1 and L2 are reversely disposed, wherein the first end L11 is situated adjacent to the fourth end L22, and correspondingly, the second end L12 is situated adjacent to the third end L21.

Thus, luminance and brightness at the ends of the fluorescent lamp assemblies L are complementary, thus facilitating illumination uniformity.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A backlight module for a flat display device, comprising:
   a light guide element having a first side;
   a first fluorescent lamp assembly, disposed on the first side, comprising:
   a first fluorescent lamp having a first end corresponding to a sealed end of the first fluorescent lamp, a second end corresponding to an exhaust end of the first fluorescent lamp, and a first phosphor coating on an inner surface of the first fluorescent lamp, wherein the first phosphor near the first end is thicker than the second end; and
   a second fluorescent lamp, parallel to the first fluorescent lamp, having a third end adjacent to the second end, a fourth end adjacent to the first end, and a second phosphor coating on an inner surface of the second fluorescent lamp, wherein the second phosphor near the third end is thicker than the fourth end.

2. The backlight module as claimed in claim 1, wherein the third end is corresponding to a sealed end of the second fluorescent lamp, and the fourth end is corresponding to an exhaust end of the second fluorescent lamp.

3. The backlight module as claimed in claim 1, wherein the first and fourth ends are electrically connected to a power supply.

4. The backlight module as claimed in claim 1, wherein the second and third ends are electrically connected to a power supply.

5. The backlight module as claimed in claim 1, wherein the first and second fluorescent lamps are cold cathode fluorescent lamps (CCFLs).

6. The backlight module as claimed in claim 1, wherein the first and second fluorescent lamps are external electrode fluorescent lamps (EEFLs).

7. The backlight module as claimed in claim 1, further comprising a second fluorescent lamp assembly, wherein the second fluorescent lamp assembly is disposed on a second side of the light guide element.

8. The backlight module as claimed in claim 7, wherein the second side is opposite to the first side.

9. A fluorescent lamp assembly, comprising:
   a first fluorescent lamp having a first end corresponding to a sealed end of the first fluorescent lamp, a second end corresponding to an exhaust end of the first fluorescent lamp, and a first phosphor coating on an inner surface of the first fluorescent lamp, wherein the first phosphor near the first end is thicker than the second end; and
   a second fluorescent lamp, parallel to the first fluorescent lamp, having a third end adjacent to the second end, a fourth end adjacent to the first end, and a second phosphor coating on an inner surface of the second fluorescent lamp, wherein the second phosphor near the third end is thicker than the fourth end.

10. The fluorescent lamp assembly as claimed in claim 9, wherein the third end is corresponding to a sealed end of the second fluorescent lamp, and the fourth end is corresponding to an exhaust end of the second fluorescent lamp.

11. The fluorescent lamp assembly as claimed in claim 9, wherein the first and fourth ends are electrically connected to a power supply.

12. The fluorescent lamp assembly as claimed in claim 9, wherein the second and third ends are electrically connected to a power supply.

13. The fluorescent lamp assembly as claimed in claim 9, wherein the first and second fluorescent lamps are cold cathode fluorescent lamps (CCFLs).

14. The fluorescent lamp assembly as claimed in claim 9, wherein the first and second fluorescent lamps are external electrode fluorescent lamps (EEFLs).

* * * * *